US006990494B2

(12) United States Patent
Bates et al.

(10) Patent No.: US 6,990,494 B2
(45) Date of Patent: Jan. 24, 2006

(54) IDENTIFYING LINKS OF INTEREST IN A WEB PAGE

(75) Inventors: Cary Lee Bates, Rochester, MN (US); John Matthew Santosuosso, Rochester, MN (US); Waheed Sujjad, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/917,054

(22) Filed: Jul. 27, 2001

(65) Prior Publication Data

US 2003/0023582 A1 Jan. 30, 2003

(51) Int. Cl.
*G06F 17/30* (2006.01)

(52) U.S. Cl. ................................ 707/10; 707/1; 707/3; 707/6; 715/513; 715/853; 709/219; 709/223

(58) Field of Classification Search .................... 707/1, 707/3, 10, 4, 5; 715/513, 853; 709/219, 223
See application file for complete search history.

(56) References Cited

U.S. PATENT DOCUMENTS

| | | | | | |
|---|---|---|---|---|---|
| 5,864,863 | A | | 1/1999 | Burrows | 707/103 |
| 5,999,929 | A | | 12/1999 | Goodman | 707/7 |
| 6,021,409 | A | | 2/2000 | Burrows | 707/12 |
| 6,037,935 | A | | 3/2000 | Bates et al. | 345/335 |
| 6,038,566 | A | | 3/2000 | Tsai | 707/102 |
| 6,092,074 | A | | 7/2000 | Rodkin et al. | 707/102 |
| 6,119,135 | A | * | 9/2000 | Helfman | 715/513 |
| 6,389,467 | B1 | * | 5/2002 | Eyal | 709/223 |
| 6,397,218 | B1 | * | 5/2002 | Stern et al. | 707/10 |
| 6,415,282 | B1 | * | 7/2002 | Mukherjea et al. | 707/3 |
| 6,424,980 | B1 | * | 7/2002 | Iizuka et al. | 715/513 |
| 6,466,940 | B1 | * | 10/2002 | Mills | 707/102 |
| 6,480,853 | B1 | * | 11/2002 | Jain | 707/10 |
| 6,516,312 | B1 | * | 2/2003 | Kraft et al. | 707/3 |
| 6,594,694 | B1 | * | 7/2003 | Najork et al. | 709/219 |
| 6,643,641 | B1 | * | 11/2003 | Snyder | 707/4 |
| 6,647,383 | B1 | * | 11/2003 | August et al. | 707/3 |
| 6,734,886 | B1 | * | 5/2004 | Hagan et al. | 715/853 |
| 6,735,628 | B2 | * | 5/2004 | Eyal | 709/223 |

FOREIGN PATENT DOCUMENTS

| | | |
|---|---|---|
| JP | 2000259674 | 9/2000 |

OTHER PUBLICATIONS

Ikeda D. et al. "Developing a Knowledge Network of URLs", Discovery Science, Second International Conference, DS '99. Proceedings (Lecture Notes in Artificial Intelligence vol. 1721), pp. 328–329 , 1999.

(Continued)

*Primary Examiner*—Jean M. Corrielus
(74) *Attorney, Agent, or Firm*—Silvy Anna Murphy; John R. Pivnichny

(57) ABSTRACT

Links in a web page relevant to search criteria are marked. In one embodiment, a search engine returns to a browser a set of URLs of web pages meeting search criteria. The browser stores the URLs, and displays links to a subset. When a searcher accesses a first web page presented by the browser, the browser examines the first web page for links to other web pages. When the first web page contains a link to a second web page, the URL of the second web page is compared with the stored URLs. If the URL of the second web page is a stored URL, the link is marked on the first web page. In another embodiment, a first web page is accessed using a browser, the browser identifies a link therein to a second web page, and accepts search criteria from the searcher. The browser sends the URL of the second web page and the search criteria to a search engine, which determines whether the second web page satisfies the search criteria. If so, the link is marked on the first web page.

12 Claims, 4 Drawing Sheets

OTHER PUBLICATIONS

Bogonikolos, N. et al "ARCHIMIDES": An Intelligent Agent for Adaptive—Personalized Navigation within a WEB Server, Proceedings of the $32^{nd}$ Annual Hawaii International Conference on Systems Sciences. 1999.

Hock, RE "Sizing up HotBot: Evaluating One Web Search Engine's Capabilities" Online Strategies; Online Inc. vol. 21, No. 6. pp. 24–28, 30, 32–33, Nov.–Dec. 1997.

Gauch S. et al. "Information Fusion with ProFusion"WebNet96—World Conference of the Web Society, Proceedings, pp. 174–19, 1996.

Research Disclosure "Link Event Internet Protocol for Communicating Link Status and Link Event Notification", No. 437118 p. 1695, Sep., 2000.

Research Disclosure "Web Search Engine with Attributes Search Method", No. 436119 p. 1429, Aug., 2000.

Research Disclosure "Web Environment System", No. 433096 p. 901, May, 2000.

Research Disclosure "A Process for the Blending of Web Content" No. 432174 pp 778–779 Apr., 2000.

Research Disclosure "Legacy Host Application Component Extraction Formatting Rules" No. 432176 pp. 780–781 Apr., 2000.

* cited by examiner

IDENTIFYING LINKS OF INTEREST IN A WEB PAGE

FIELD OF THE INVENTION

The present invention relates generally to the Internet and World Wide Web, and more particularly to identifying and calling attention to links of interest included within a web page.

BACKGROUND

One of the most remarkable success stories of recent times is the rapid growth and widespread acceptance of the Internet-based World Wide Web. Pages of the web contain a wealth of information on a great many topics of both casual and professional interest.

Simply by entering keywords into a web browser that works in concert with an Internet search engine, an Internet searcher can search the web, and thereby locate relevant web pages. However, a search may well find far more information than the searcher can consider, due to the abundance of information that is now accessible through the web. For example, an Internet search defined by a few keywords might uncover hundreds of related web sites.

In order to make the results of a search tractable, the browser's presentation of the search results is limited to a relatively small number of web pages, even though the search engine may have found a larger number of relevant web pages. Further, the pages that are presented are often ranked according to their relevancy to the search using rules that are known by the search engine but often unknown by the searcher. For example, although the search engine might find 895 web pages that satisfy the search criteria, the browser might rank and present only 200 of these pages to the searcher. Because of these limitations, the searcher is unable to gain the full benefit of the wealth of information that is potentially available through the Internet.

As an aid to searchers, web pages themselves often include links to other web pages that are somehow related. For example, a search for information on the agricultural products of the fictional state of Heartland might locate a web page sponsored by the Heartland Department of Agriculture. The web page of the Heartland Department of Agriculture—the first web page—might itself provide links to other web pages potentially of interest. One of the links from the first web page might be to a second web page, that of the California Institute for Citrus Research, while another of the links from the first web page might be to a third web page that provides a biography of the Heartland Commissioner of Agriculture. Clearly, the second web page might be of interest to the searcher, whereas the third web page might not.

Unfortunately, the relevancies of the links that appear on the first web page are not necessarily so clear as in the example above regarding Heartland. In practice, a searcher has no way to determine with any degree of confidence which web-page-to-web-page links to pursue and which not, as the transition from one web page to another takes the searcher away from the rankings of suitability provided by the search engine, however useful these rankings might or might not turn out to be.

Sometimes a search is not conducted systematically, meaning that the search does not begin with a search engine's enquiry. Rather, the search may begin by accessing a web page known to the searcher or discovered accidentally, and proceed by following links from that page. This unsystematic searcher faces the same problem as the systematic searcher who begins with a search engine—the searcher has no way to determine with any degree of confidence which web-page-to-web-page links to pursue and which not—but the unsystematic searcher lacks even the initial rankings of suitability provided by the search engine.

Thus there is a need for a way of providing an indication of relevance of links that take an Internet searcher from one web page to another, whether a search begins systematically or not, so that the searcher may efficiently explore the wealth of information that is available—in principle—through the Internet, but which often goes unfound in practice, without being led astray by links to pages lacking relevancy.

SUMMARY OF THE INVENTION

The present invention marks web-page-to-web-page links that are relevant to search criteria such as keywords, so that a searcher may navigate efficiently through the vast store of information that is accessible through the Internet.

According to one embodiment of the invention, a searcher provides search criteria such as a set of keywords to a web browser. The browser sends the search criteria to a search engine, which returns to the browser a set of uniform resource locators (URLs) that identify web pages meeting the search criteria. The browser stores the URLs of the web pages in memory, and conventionally displays a search-results page (or pages) that includes links to a subset of the web pages found by the search engine. When the searcher accesses a first web page using a link that is presented by the search-results page, the browser examines the first web page for links to other web pages. When the first web page contains a link to a second web page, the URL of the second web page is compared with the URLs stored in the memory. If the URL of the second web page matches one of the URLs stored in the memory, the browser marks the link on the first web page, for example by highlighting it on a visual display, thereby alerting the searcher that this link may be of interest. Because the search engine may return many more URLs than the search results page can usefully present to the searcher, the marked link may in fact lead the searcher to a useful web page that the search engine found but the browser was unable to present.

According to another embodiment of the invention, a searcher may access a first web page using a browser. When so instructed by the searcher, the browser examines the first web page, identifies a link to a second web page, and accepts search criteria from the searcher. The browser sends the URL of the second web page and the search criteria to a search engine. The search engine determines whether the web page specified by the URL—the second web page—meets the search criteria. If so, the search engine informs on the first web page.

Thus, the present invention identifies and calls the searcher's attention to web-page-to-web-page links that satisfy given search criteria, and thereby improves the searcher's efficiency in navigating the vast wealth of information that is accessible through the Internet. These and other aspects of the present invention will be more fully appreciated when considered in light of the following drawings and detailed description.

DETAILED DESCRIPTION

The present invention marks web-page-to-web-page links that are relevant to given search criteria such as keyword matching, so that a searcher may navigate efficiently through pages of the World Wide Web accessible through the Internet.

Figure 1:
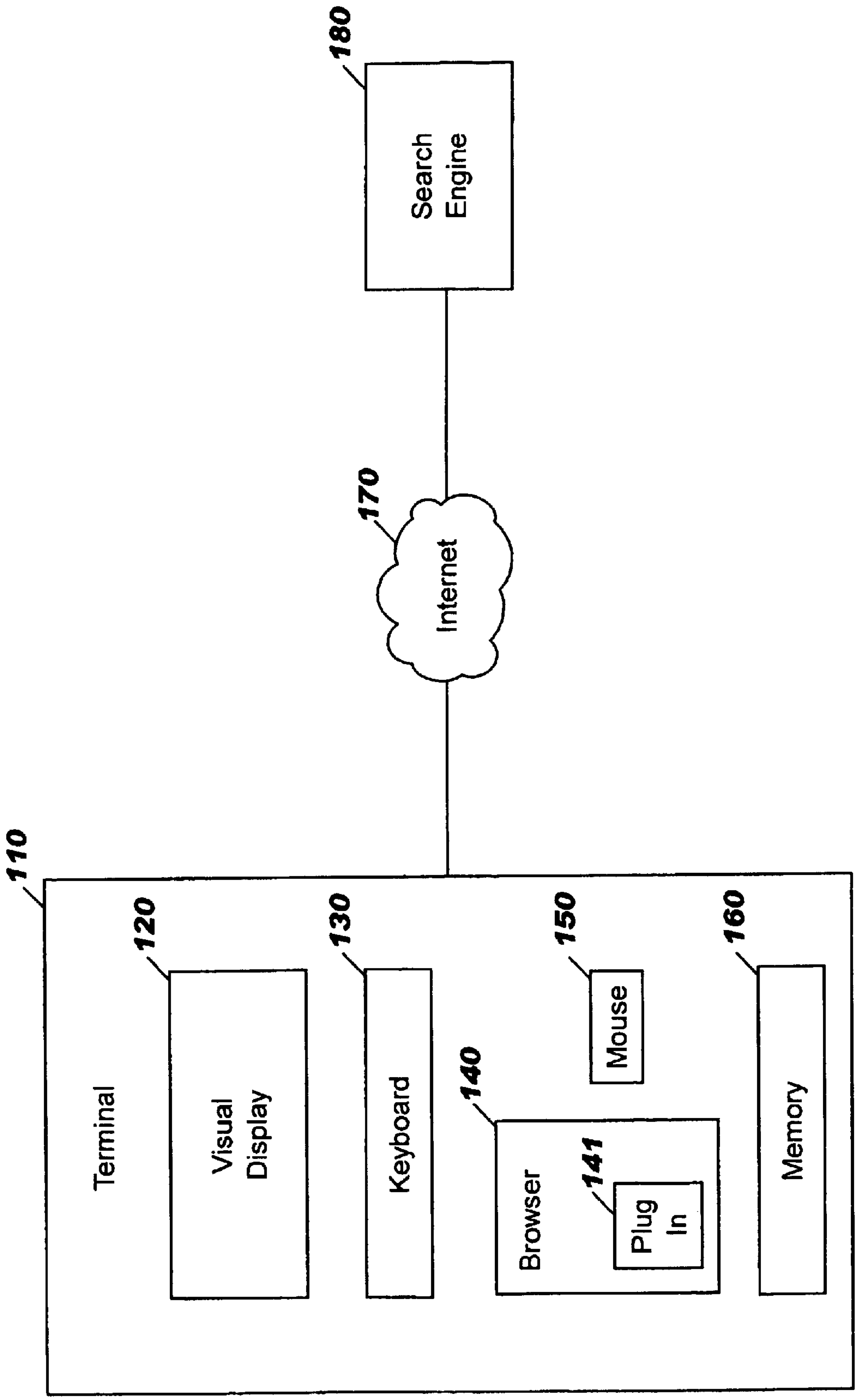
FIG. 1 is a block diagram that shows a structure and environment suitable for use of the present invention.

FIG. 1 shows a structure and environment suitable for use of the present invention. A searcher 100 uses a terminal 110 such as a computer terminal, or equivalently a web-enabled cellular telephone, a personal digital assistant, a special-purpose Internet-access device, and so forth, to interact with a search engine 180 such as an Internet search engine and to view web pages accessible through the Internet 170. The terminal 110 may be connected by the Internet 170 or other communication network to the search engine 180.

The terminal 110 may include a visual display 120, such as a computer monitor screen, that is appropriate to the nature of the terminal 110, a keyboard 130 or equivalently a keypad, a web browser 140, which may include a plugin 141 that provides programmable-processor code for implementing the present invention, a computer mouse 150 or equivalent device such as a trackball, up and down keys, jog wheels, and so forth, and a memory 160 suitable for storing lists of Uniform Resource Locators (URLs). The memory 160 may be internal to the web browser 140, or may be located elsewhere internal or external to the terminal 110, and may be included within a larger memory that is used for other purposes.

Figure 2A:
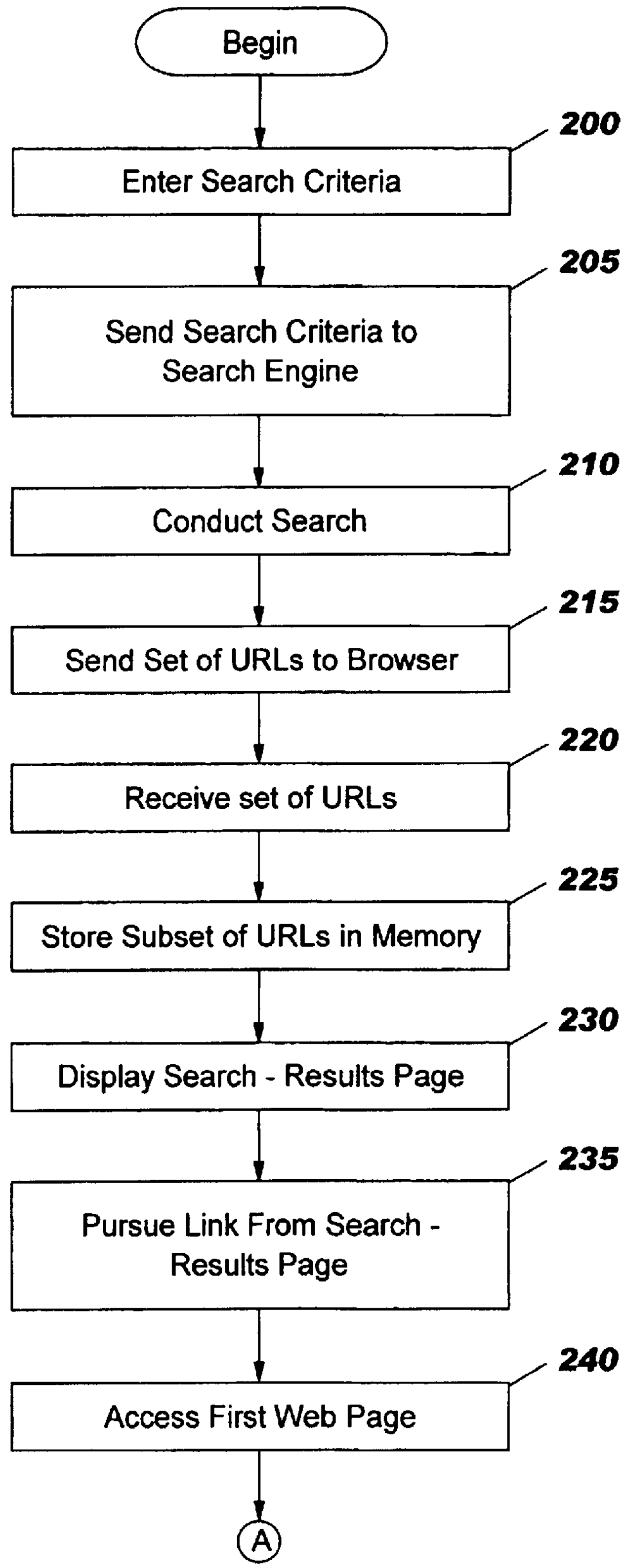
FIG. 2 is a flowchart that shows aspects of the operation of a first embodiment of the invention.
Figure 2B:
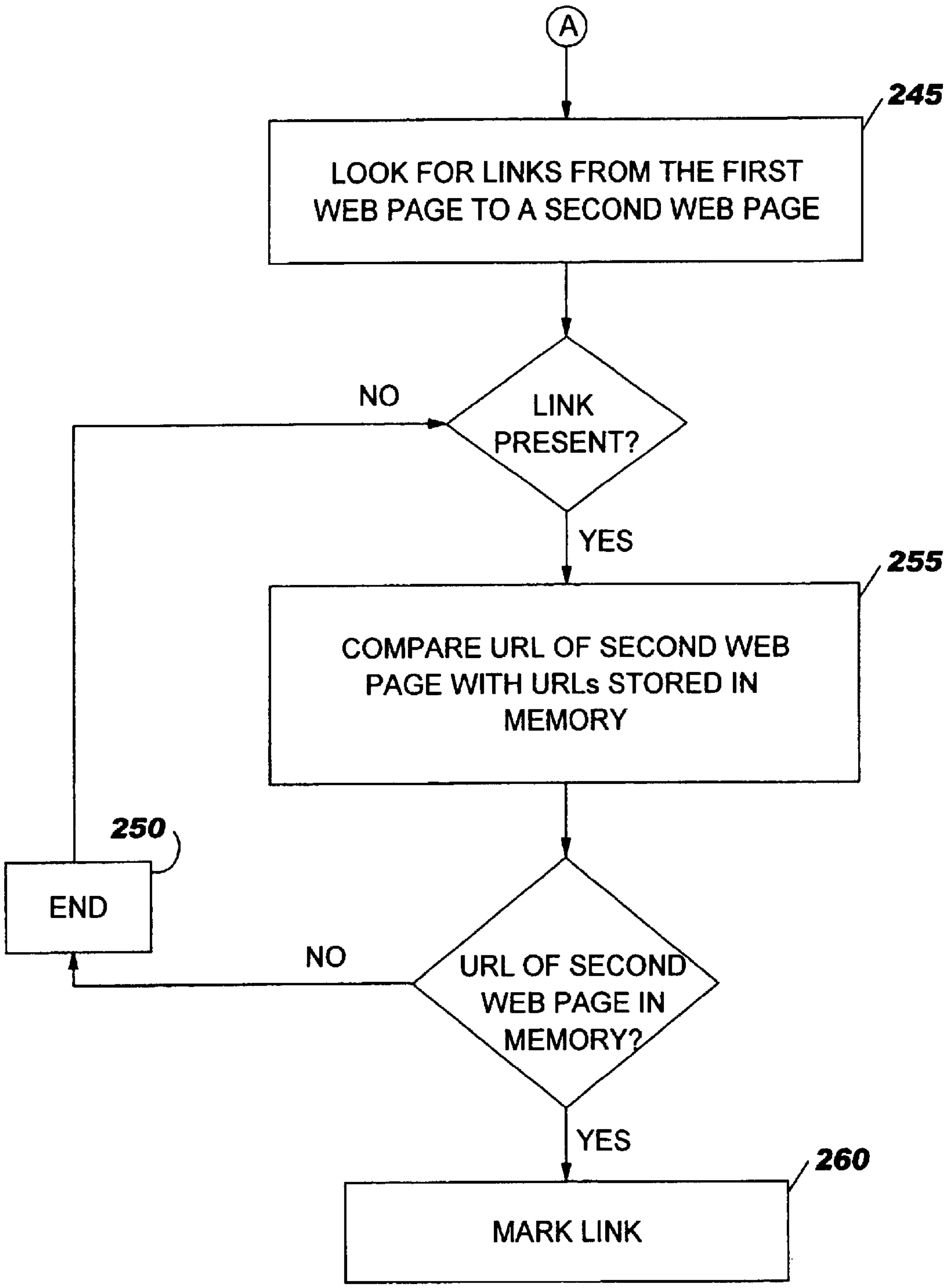

FIG. 2 shows aspects of the operation of a first embodiment of the invention. Using the keyboard 130 or other input means, the searcher 100 enters search criteria such as keywords and associated logical operations into the browser 140 (step 200). The browser 140 sends the search criteria to the search engine 180 (step 205). The search engine 180 conducts a search, looking for pages of the World Wide Web that satisfy the search criteria (step 210). Upon completion of the search, the search engine 180 sends, to the browser 140, a set of URLs of web pages the search engine 180 has found that satisfy the search criteria (step 215). In practice, the search engine 180 may find a very large number of URLs associated with web pages that satisfy the search criteria. For this reason, the number of URLs returned to the browser 140 by the search engine 180 may be capped, for example at a maximum of 1000 URLs.

The browser 140 receives the set of URLs found by the search engine 140 (step 220), and stores a subset of the set of URLs in the memory 160 (step 225). It is important to note that the word "subset" is used here in a mathematical sense, wherein a subset of a set may include all the elements of the set, and wherein a proper subset of a set may not include all of the elements of the set. In other words, if a set contains N elements, a subset of the set may contain all of the N elements, but a proper subset of the set may contain at most N-1 of the elements. Thus the set of URLs returned to the browser 140 may be stored in its entirety in memory 160, or not in its entirety when the set is too large to be contained in the memory 160. For example, the memory 160 might have capacity to store 500 URLs. Were the set of URLs returned to the browser 140 to contain 400 URLs, the subset stored in the memory 160 could be the subset that included all 400 of the URLs. On the other hand, were the set of URLs to contain 700 URLs, only a proper subset could be stored in memory 160, where the proper subset could contain 500 URLs at most.

The browser 140 displays on the display 120 a search-results page that may include links to web pages whose URLs appear also in the set of URLs returned by the search engine 180 (step 230). The search results page may include links to all of the URLs returned by the search engine 180, or may include links to only some of the URLs returned the search engine 180, depending on the configuration and capacity of the browser 140 and the visual display 120.

Using the computer mouse 150, or the keyboard 130, or other input means, the searcher 100 may select and pursue one of the links presented by the search results paged (step 235). The browser 140 accesses the web page that corresponds to the selected link (step 240), which web page is called here the first web page for convenience. The browser 140 examines the first web page, looking for links from the first web page to a second web page (step 245). If no such link is found, the process ends (step 250). Otherwise (i.e., a link is found from the first web page to a second web page), the web browser 140 compares the URL of the second web page to the set of URLs stored in the memory 160 (step 255).

If the URL of the second web page is found in the list of URLs stored in the memory 160, the browser 140 marks the link on the first web page (step 260), and the process ends (step 250). Otherwise (i.e., the URL of the second web page is not found in the list of URLs in the memory 160) the process ends (step 250).

A link may be marked, for example, by altering the characteristics of its appearance on the visual display 120. The appearance may be altered by, for example, highlighting the link, changing the color used to display the link, changing the font used to display the link, causing the link to appear and disappear (to blink), alternating fonts or colors, alternating highlighting and the absence of highlighting, and so forth.

Figure 3:
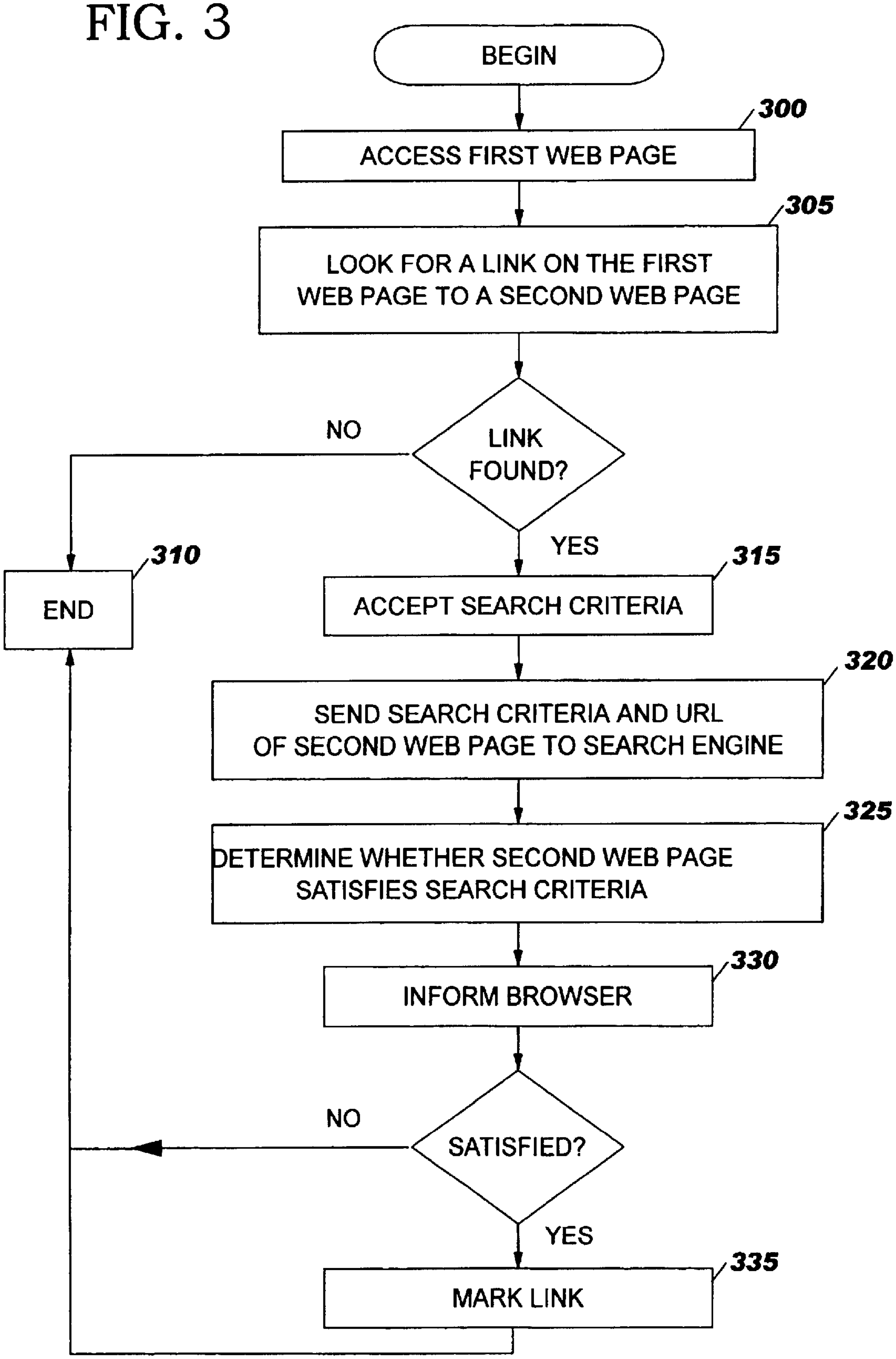
FIG. 3 is a flowchart that shows aspects of the operation of a second embodiment of the invention.

FIG. 3 shows aspects of the operation of a second embodiment of the invention. The browser 140 accesses a first web page specified by the searcher 100 (step 300). The browser 140 then examines the first web page, looking for a link from the first web page to a second web page (step 305). If no such link is found, the process ends (step 310).

Otherwise (i.e., a link is found from the first web page to a second web page), the browser 140 accepts search criteria entered by the searcher 100 (step 315). It is important to note that the step of accepting search criteria from the searcher 100 (step 315) may occur earlier in the operation of the present invention. The browser 140 sends the search criteria and the URL that identifies the second web page to the search engine 180 (step 320), in order that the search engine 180 might determine whether the second web page satisfies the search criteria.

The search engine 180 determines whether the second web page satisfies the search criteria.(step 325), and informs the browser 140 of the determination by the search engine 180 (step 330). If the second web page does not satisfy the search criteria, the process ends (step 310). Otherwise (i.e., the second web page satisfies the search criteria), the browser marks the link from the first web page to the second web page (step 335), and the process ends (step 310).

From the foregoing description, those skilled in the art will recognize that the present invention provides useful guidance that takes a searcher through linked web pages, so that the searcher may take full advantage of the wealth of information accessible through the Internet. Once taught the present invention, those skilled in the art will recognize that the above descriptions of two embodiments of the invention are shown as single threads only for clarity of illustration, and that each of the embodiments may readily be re-cast to accommodate more than one thread. For example, the operation of the first embodiment may, of course, consider links from the first web page to a third web page, to a forth web page, and so on, marking these links when appropriate, rather than ending after considering only the link from the first web page to the second web page. Similarly, the operation of the second embodiment might send more than one URL from the browser to the search engine rather than a single URL, and mark the associated links appropriately. In these and other ways, the foregoing description of the invention is illustrative rather than limiting, and the present invention is limited only by the following claims.

We claim:

1. A method for identifying links to web pages of interest, said method comprising the steps of:

providing a web browser with a programmable processor code;

said browser storing, in a memory, a set of URLs found by a search engine in a search;

said browser accessing a first web page selected by a computer searcher, said first web page being identified by a first URL included in said set of URLs found by said search engine;

said browser examining said first web pane for a link to a second web page identified by a second URL;

said browser comparing said second URL with said set of URLs stored in said memory; and said browser marking on said first web page said link to said second web page identified by said second URL when said second URL matches a URL in said set of URLs stored in said memory.

2. The method of claim 1, wherein said step of said browser marking on said first web page further includes the step of said browser highlighting a presentation of said link to said second web page by a visual display.

3. The method of claim 1, wherein said step of said browser marking on said first web page further includes the step of said browser changing a color of a presentation of said link to said second web page by a visual display.

4. The method of claim 1, wherein said step of said browser marking on said first web page further includes the step of said browser changing a font of a presentation of said link to said second web page by a visual display.

5. A computer implemented method for identifying links to web pages of interest to a computer searcher, said method comprising the steps of:

providing a web browser with a programmable processor code;

said browser sending a search criteria for a search entered by said computer searcher to a search engine;

said browser receiving a set of URLs found by said search engine for said search criteria;

said browser storing a subset of said set of URLs in a memory;

said browser displaying a search results page that includes a plurality of links to a set of web pages corresponding to said set of URLs found by said search engine;

said browser accessing a first web page selected by said computer searcher, said first web page being identified by a URL included in said set of URLs found by said search engine;

said browser examining said first web page for a link to a second web page identified by a second URL;

said browser comparing said second URL with said subset of said set of URLs stored in said memory; and said browser marking on said first web page said link to said second web page identified by said second URL when said second URL matches a URL in said subset of said set of URLs stored in said memory, wherein said browser alerts said computer searcher to said second URL.

6. The method of claim 5, wherein said subset is a proper subset.

7. The method of claim 5, wherein said step of said browser marking further includes the step of said browser highlighting a presentation of said link to said second web page by a visual display.

8. The method of claim 5, wherein said step of said browser marking further includes the step of said browser changing a color of a presentation of said link to said second web page by a visual display.

9. The method of claim 5, wherein said step of said browser marking further includes the step of said browser changing a font of a presentation of said link to said second web page by a visual display.

10. Programmable media containing programmable software to identify links to web pages of interest to a searcher, said programmable software including a web browser with a programmable processor code and comprising the steps of:

said browser storing, in a memory, a set of URLs found by a search engine in a search;

said browser accessing a first web page selected by a computer searcher, said first web page being identified by a first URL included in said set of URLs found by said search engine;

said browser examining said first web page for a link to a second web page identified by a second URL;

said browser comparing said second URL with said set of URLs stored in said memory; and said browser marking on said first web page said link to said second web page identified by said second URL when said second URL matches a URL in said set of URLs stored in said memory.

11. Programmable media containing programmable software to identify links to web pages of interest to a searcher, said programmable software including a web browser with a programmable processor code and comprising the steps of:

said browser sending a search criteria for a search entered by said computer searcher to a search engine;

said browser receiving a set of URLs found by said search engine for said search criteria;

said browser storing a subset of said set of URLs in a memory;

said browser displaying a search results page that includes a plurality of links to a set of web pages corresponding to said set of URLs found by said search engine;

said browser accessing a first web page selected by said computer searcher, said first web page being identified by a URL included in said set of URLs found by said search engine;

said browser examining said first web page for a link to a second web page identified by a second URL;

said browser comparing said second URL with said subset of said set of URLs stored in said memory; and said browser marking on said first web page said link to said second web page identified by said second URL when said second URL matches a URL in said subset of said set of URLs stored in said memory, wherein said browser alerts said computer searcher to said second URL.

12. The programmable media of claim 11, wherein said subset is a proper subset.

* * * * *